United States Patent

Anderson

[11] Patent Number: 5,825,515
[45] Date of Patent: Oct. 20, 1998

[54] SUPERVISORY APPARATUS FOR OPTICAL TRANSMISSION SYSTEM

[75] Inventor: Cleo D. Anderson, Colts Neck, N.J.

[73] Assignee: Lucent Technologies Inc., Murray Hill, N.J.

[21] Appl. No.: 651,449

[22] Filed: May 22, 1996

Related U.S. Application Data

[63] Continuation of Ser. No. 308,472, Sep. 19, 1994, abandoned, which is a continuation-in-part of Ser. No. 78,499, Jun. 21, 1993, abandoned, which is a continuation of Ser. No. 753,582, Sep. 3, 1991, abandoned.

[51] Int. Cl.$^6$ ...................................................... H04B 10/08
[52] U.S. Cl. ........................... 359/110; 359/166; 359/179
[58] Field of Search ........................... 359/110–111, 113, 359/161, 153, 166, 173, 176, 174, 177, 179, 141, 194

[56] References Cited

U.S. PATENT DOCUMENTS

| | | | |
|---|---|---|---|
| 4,022,988 | 5/1977 | Lentz et al. | 375/3.1 |
| 4,211,920 | 7/1980 | Wakabayashi | 455/601 |
| 4,270,029 | 5/1981 | Sato et al. | 359/177 |
| 4,278,850 | 7/1981 | Sato et al. | 359/110 |
| 4,300,239 | 11/1981 | Wakabayashi et al. | 455/601 |
| 4,449,246 | 5/1984 | Seiler et al. | 455/9 |
| 4,451,916 | 5/1984 | Casper et al. | 359/110 |
| 4,564,933 | 1/1986 | Hirst | 371/20.2 |

(List continued on next page.)

FOREIGN PATENT DOCUMENTS

| | | | |
|---|---|---|---|
| 0111582 | 6/1984 | European Pat. Off. . | |
| 0316660 | 5/1989 | European Pat. Off. | 359/174 |
| 3201375 | 7/1983 | Germany | 359/166 |
| 3042815 | 5/1984 | Germany . | |
| 54-93911 | 7/1979 | Japan . | |
| 54-133001 | 10/1979 | Japan . | |
| 55-105452 | 8/1980 | Japan . | |

(List continued on next page.)

OTHER PUBLICATIONS

Y. Kobayashi, "A Repeater Fault Loactor Using a Correlation Technique . . . ", IEEE Trans. on Comm., vol. COM–30, No. 5, May 1982, pp. 1117–1124.

(List continued on next page.)

Primary Examiner—Kinfe-Michael Negash
Attorney, Agent, or Firm—E. S. Indyk; R. E. Rudnick

[57] ABSTRACT

A relatively simple, low cost apparatus detects the presence and location of faults in an optical transmission system. It is particularly applicable to underwater optical transmission systems. The optical transmission system contains at least one optical fiber pair extending between two terminals. Optical amplifier based repeaters are located at predetermined positions along fibers. Each repeater has a simple high-loss optical loopback circuit which is used to provide fault identification and location. The loopback circuit couples a portion of the optical signal travelling from a transmitting station through one of the fibers, attenuates that portion of the optical signal, and adds the attenuated signal to the optical signal in the other fiber for return to the transmitting station. Fault location is accomplished by launching a supervisory signal into the fiber from one of the terminals. At each repeater, the loopback circuit causes an attenuated version of the supervisory signal to return to the station from which it was launched, combined with any noise and signal in the return lines. The supervisory signal is a pseudo-random word which can be recovered from the signal and noise in the return line via a correlation technique. The loopback circuit in the repeaters is composed of passive components which may comprise a pair of optical couplers each of which is adjacent one of the two transmission fibers. The optical couplers are connected by a fiber containing a preselected amount of attenuation. There is no need for any sensing circuitry in the repeater to activate the loopback in response to command signals in the supervisory signal. The production of the supervisory signal consequently is simplified because there is no need for command information to be a part of the supervisory signal. Degradation of signals through the optical transmission system is easily detected in a reasonable amount of time at the terminals of the system via the correlation technique. In addition, the correlation technique allows one to easily identify the location of the degradation on the transmission line.

11 Claims, 3 Drawing Sheets

U.S. PATENT DOCUMENTS

| | | | |
|---|---|---|---|
| 4,887,309 | 12/1989 | Andersson et al. | 359/177 |
| 5,010,544 | 4/1991 | Chang et al. | 370/13.1 |
| 5,043,976 | 8/1991 | Abiven et al. | 359/110 |

FOREIGN PATENT DOCUMENTS

| | | | |
|---|---|---|---|
| 0130246 | 10/1980 | Japan | 359/166 |
| 0104538 | 6/1983 | Japan | 359/166 |
| 2-28158 | of 1990 | Japan | H04B 3/46 |
| 0043830 | 2/1990 | Japan | 359/110 |
| 2123236 | 1/1984 | United Kingdom . | |
| 2191356 | 12/1987 | United Kingdom . | |

OTHER PUBLICATIONS

Y. Kobayashi et al., "Repeater Fault Location for a Submarine . . . ", IEEE Trans. on Comm., vol. COM–32, No. 2, Feb. 1984, pp. 155–162.

Y. Hayashi et al., "Remote Control Signal for Submarine Optical . . . ", Elec. and Comm. in Japan, Part I, vol. 69, No. 9, 1986, pp. 93–99.

C. D. Anderson et al., "The SL Supervisory System", Jour. of Lightwave Technology, vol. LT–2, No. 6, Dec. 1984, pp. 991–997.

A. D. Ellis et al., "Supervisory System For Cascaded Semiconductor Laser . . . ", Electronics Letters, Mar. 2, 1989, vol. 25, No. 5, pp. 309–311.

SUPERVISORY APPARATUS FOR OPTICAL TRANSMISSION SYSTEM

This application is a continuation of application Ser. No. 08/308,472, filed on Sep. 19, 1994, now abandoned, which is a continuation in part of application Ser. No. 08/078,499 filed Jun. 21, 1993, now abandoned, which is a continuation of application Ser. No. 07/753,582 filed on Sep. 3, 1991, now abandoned.

FIELD OF THE INVENTION

This invention relates to optical transmission systems. More particularly, this invention relates to line monitors for optical transmission systems and is especially advantageous in linearly-repeatered submarine optical transmission systems.

BACKGROUND OF THE INVENTION

It is imperative that the performance of transmission systems be monitored. Faults must be identified and corrective action must be taken to maintain an adequate level of service. It is particularly advantageous to accurately and economically identify the presence of a fault and its location from the terminals of the transmission system. This is particularly the case in undersea transmission systems which cannot be conveniently subjected to testing along the undersea portion of the transmission system between the shore terminals. Accordingly, there has been an ongoing effort to develop ways of monitoring the presence and location of faults on undersea and other transmission systems from the end terminals of the cable, all of which are unsatisfactory in terms of complexity, cost, and applicability to current optical amplifier-based transmission system designs.

In the past, repeaters spaced along the transmission system contained complicated circuitry which was used in supervising the transmission system. That circuitry included resonant amplifiers, special transmitters, and control circuitry responsive to commands embedded in complex supervisory signals launched into the transmission system. This added much to the cost of constructing each repeater. The complexity of this supervisory circuitry made it prone to failure. The cost of repair was high because the repeaters are relatively inaccessible. Also, some prior supervisory systems were unattractive because they could be used only when the transmission system was out of service. Some techniques developed for coaxial electrical transmission systems are based on pecularities unique to those systems and have not been recognized as applicable to current optical transmission systems.

The first transatlantic telephone cables required two cables for the deepsea portion, one for each direction of transmission. Because each cable carried signals in one direction only, supervision was limited to receive only techniques. Each repeater on that cable, in addition to amplifying the traffic signals, generated a unique narrow band noise peak. This was accomplished by the addition of a single quartz crystal resonator to the amplifier feedback circuit in each repeater. The crystal caused a narrow-band gain peak which, in turn, amplified the incoming system noise in a selected frequency band unique to each repeater. The noise peak signatures of the repeaters were monitored at the receiving terminals. Presence of the signal indicated that the associated repeater was intact. Transmission measurements from terminal to terminal in the crystal frequency bands provided information from which amplifier gain changes could be inferred.

A later system provided bidirectional transmission over a single cable by the use of a common amplifier and directional filters to separate the two directions of transmission into two separate frequency bands. Transmission in one direction occurred in a low frequency band and transmission in the other direction occurred in a high frequency band. Like the two cable systems, this later system used crystal determined noise peaks as the primary supervisory technique. High resolution spectrum analyzers made it possible to monitor noise peaks from many repeaters simultaneously, and thus locate failures, such as unstable singing amplifiers. Because both directions of transmission were carried on the same cable and by the same amplifiers, another method of locating faults was developed. On an out-of-service basis short, repetitive, relatively high powered tone bursts were transmitted at a frequency near the upper end of the low frequency band. Nonlinearity of the amplifiers produced second order intermodulation products of the tone bursts which fell into the high frequency band and were returned to the sending terminal. Returns from individual repeaters, after filtering and amplifying, could be identified by their characteristic delay. Because the amplifiers were highly linear, the returned signals were very weak and time averaging techniques were developed to improve the accuracy and range of the measurement.

In later systems, each repeater contained a unique-frequency highly stable crystal-controlled oscillator. The oscillators were assigned to two narrow supervisory bands, one near the bottom of the low band and one near the top of the high band. Repeaters were placed in sequence so that their oscillators alternated between low band and high band, thus minimizing uncertainties in the location of faults. Fault location was now simpler and faster because of the easily identifyable oscillator tones whose level could be plotted and tracked in time, thus indicating loss distributions. Out-of-service tone burst methods of identifying operating repeaters were improved mainly by the use of multichannel (delay) analyzers and longer period of post detection averaging.

The last coaxial undersea cable system was supervised with an oscillator in each repeater and by a specially developed repeater monitoring set. Since the success in linearizing the amplifiers in the repeaters made it impossible to detect tone bursts translated from one transmission band to another by intermodulation, a chirp frequency technique was used to recover the returned repeater signals from the noise on an out-of-service basis. In addition to locating or verifying fault location, this technique could also locate sources of high intermodulation and localized transmission anomalies. Although this technique had a remarkable ability to retrieve signals severely imbedded in noise, its implementation was very complex. Maintenance, therefore, was and still is a problem.

In 1982 Y. Kobayashi et al. published a paper entitled "A Repeater Fault Locator Using a Correlation Technique for a Submarine Cable System", *IEEE Transactions on Communications*, Vol. Com-30, No. 5, May 1982, pp. 1117–1124. The paper refers to a repeater fault locater using correlation of pseudo-random sequences launched on a coaxial submarine cable. That locater, however, is only applicable to coaxial cables involving the previously noted bidirectional transmission in two frequency bands and having repeaters which contain amplifiers sufficiently nonlinear to cause intermodulation products to be returned to the terminal in sufficient amounts to be conveniently detectable. Also, the paper states that the locater is used when the cable is out of service. There is no indication how in-service monitoring might be accomplished. There is no indication of how such techniques might be used in an optical transmission system as there is no such return of intermodulation products in an optical system.

With the advent of regenerative lightwave undersea systems, the character of supervisory systems changed drastically. In comparison to linear coaxial cable repeaters, lightwave electro optical regenerators are extremely complex, which necessitates adding redundancy to the system. In this regard, regenerative systems can be equipped with spare transmitters as well as a spare line that can be accessed on a span-by-span basis. This control of redundant elements requires switching which is controlled from the terminals by a command/response type supervisory system. In those systems complicated supervisory commands are carried to the repeaters. Each repeater and regenerator contains a complicated supervisory circuit that recovers and interprets commands, checks the address portion of the command against the local address, executes the command, and generates the appropriate response. Commands invoke two types of actions, switching or monitoring. Examples of switching functions include enabling the spare transmitter, enabling loopback of the data signal, and accessing the standby span. Monitoring functions include measurement of input optical power to the receiver, laser-transmitter bias, block error count, temperature, sensitivity margin, etc. in addition to the reporting of the state of switches. The monitored information contained in the response is carried to the terminals by phase modulation of the data stream.

Because the performance degradation of a single span in a regenerative system can result in the failure of that line, it is necessary to monitor individual span margins routinely to insure adequate overall system margin. Linear amplifier based systems are not as dependent upon individual span degradations because each span contributes only a small part of the total degradation.

Two examples of fault location systems in regenerative repeatered optical systems are reported by Kobayashi et al., "Repeater Fault Location for a Submarine Optical Fiber Cable Transmission System", *IEEE Transactions on Communications*, Vol. Com-32, No. 2, Feb. 1984, pp. 155–162, and Hayashi et al., "Remote Control Signal for Submarine Optical Repeater Fault Location Systems," *Electronics Communications in Japan, Part I*, Vol. 69, No. 9, 1986, pp. 93–99.

It is plain that there has been a long history of efforts being made to identify and locate faults on electrical and optical transmission systems. Those efforts have resulted in line monitoring systems of ever increasing cost and complexity. There has been a long standing but unsatisfied need for a simple, cost effective, and reliable line monitoring system which provides sufficient information to determine the existence and location of faults on a transmission system, particularly on an optical transmission system. It is, therefore, an object of the invention to provide such a line monitor.

SUMMARY OF THE INVENTION

A line monitoring system for an optical transmission system includes a lossy loopback path between fiber pairs in an optical repeater. Supervisory signals are launched from one terminal of the transmission system into one of the fibers and looped back to the launching terminal. The amplitude of the loopback signals indicate changes in service and performance. The time at which loopback signals are received indicate the location where the loopback occurred. An interference canceller provides the means of reducing the interference on the loopback signals produced by the incoming data signal, thus making in-service line monitoring possible in a practical measurement times. The interference canceller also provides a measure of the end-to-end signal-to-noise ratio and operating system margin.

DETAILED DESCRIPTION

Figure 1:
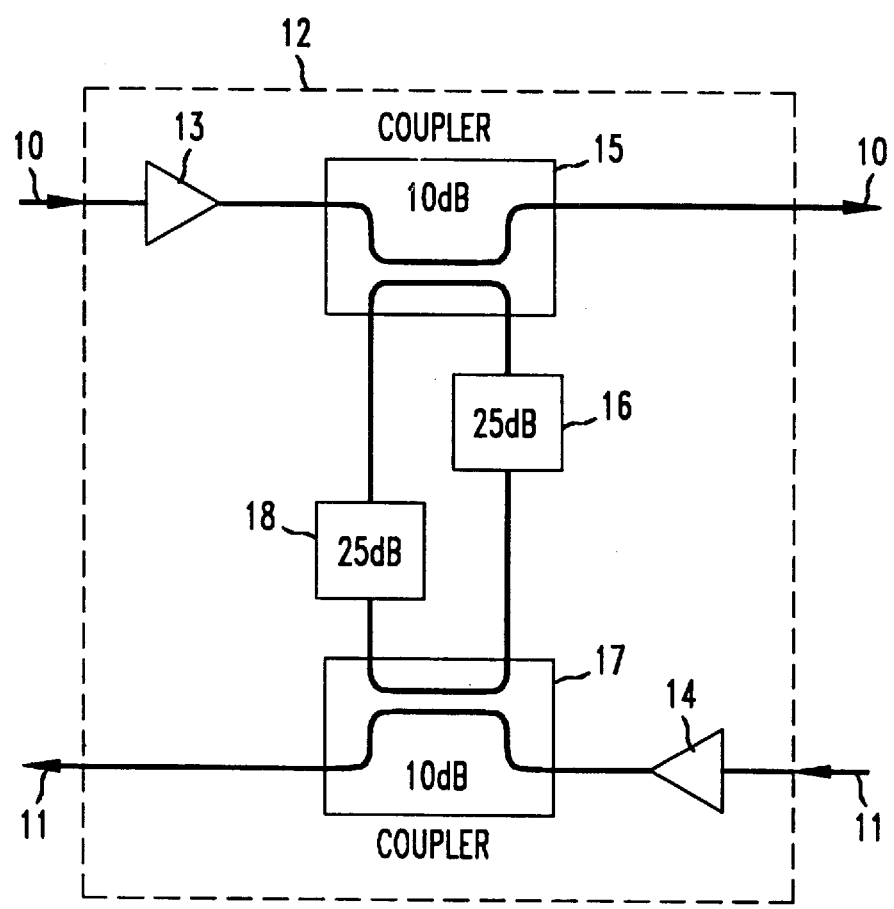
FIG. 1 is a schematic diagram of an optical repeater in accordance with the invention.

FIG. 1 shows an example of an optical repeater 12 in accordance with this invention. One or more of these repeaters 12 are located at predetermined positions along the length of an optical transmission system to amplify optical signals propagating along the transmission system.

The transmission system comprises a first optical fiber 10 which carries optical signals from a first terminal to a second terminal, as indicated by the arrows in FIG. 1. The transmission system also comprises a second optical fiber 11 which carries optical signals from the second terminal to the first terminal. As the optical signals travel from one end terminal to another, they become progressively attenuated. Accordingly, one or more repeaters 12 are spaced along the fibers 10 and 11 to amplify the attenuated optical signals. This amplification is accomplished by an amplifier 13 in fiber 10 and another amplifier 14 in fiber 11. Any technique for amplifying optical signals in an optical transmission system may be used to accomplish the function of amplifiers 13 and 14. One example of suitable amplification is a laser pumped section of erbium doped optical fiber with power to the laser supplied by a dedicated current line connected to the repeater. In submarine systems, the first and second terminals are located on shore and the fibers 10 and 11 and repeaters 12 are underwater.

Supervision or line monitoring is accomplished via a permanently connected passive and lossy loopback circuit in the repeater 12. The loopback circuit comprises an optical coupler located in the fiber 10 at the output line of amplifier 13. The optical coupler 15 couples a portion of the signal in fiber 10 to the input of an attenuator 16. The output of the attenuator 16 is connected to the input of an optical coupler 17 which is located in fiber 11 at the output of amplifier 14. The optical coupler 17 couples a portion of the attenuated signal from attenuator 16 to the optical signal flowing in fiber 11 for return to the terminal transmitting along fiber 10.

As described in more detail below, the optical signals in fibers 10 and 11 contain a supervisory signal useful for identifying and locating faults in the optical transmission system. The supervisory signal may be extracted from the rest of the signal flowing into a transmitting end station to give an indication of any deterioration in the transmission system and the location of any such deterioration.

The loopback circuit of FIG. 1 is bidirectional. In this regard, optical coupler 17 also couples a portion of the optical signals flowing in fiber 11 to the input of another attenuator 18. The output of attenuator 18 is connected to the input of coupler 15, which couples a portion of the attenuated signal from attenuator 18 for return to the terminal transmitting along fiber 11. As in the case described above, a supervisory signal is launched from the terminal transmitting along fiber 11 and is looped back to that transmitting terminal along fiber 10.

The loopback loss and modulation index are chosen to minimize degradation to the traffic signals on the transmitting and receiving lines and to provide an adequate level of loopback signals for in-service monitoring. For example, the in-service modulation index could be in the 1 to 10 percent range and the total loopback loss could be from about 45 dB for systems containing up to about 300 repeaters down to about 30 dB for systems having about 10 repeaters.

This is a simple and cost effective alternative to the ponderous complexity of prior supervisory systems developed for electro optical regenerators. The added repeater components in FIG. 1 include two couplers, which each may be, for example, 10 dB couplers, and two optical attenuators, which each may be, for example, 25 dB attenuators, providing a total of 45 dB of loss for each loopback. This simple but highly stable loopback path provides a means of accurately measuring the loop loss to any repeater from either terminal. Studies have shown that any change in system transmission that is likely to affect service will be identifiable as a change is measured loopback losses. As the description below makes plain, the quantity that is actually measured via this technique is a relatively low-frequency amplitude modulation of the average transmitted signal power. The amplitude modulation remains coupled to the average signal power through the processes of amplification, dispersion, and spectral broadening due to fiber nonlinear effects. As discussed above, for in-service line monitoring, the amplitude modulation index is low, typically about 1 to 10 percent, preferably 2 to 5 percent, to minimize signal degradation. For out-of-service monitoring, the modulation index is increased to 100 percent replacing the high-bit rate data signals. Detection of the supervisory portion of the loopback signal requires a technique which will now be described.

Figure 2:
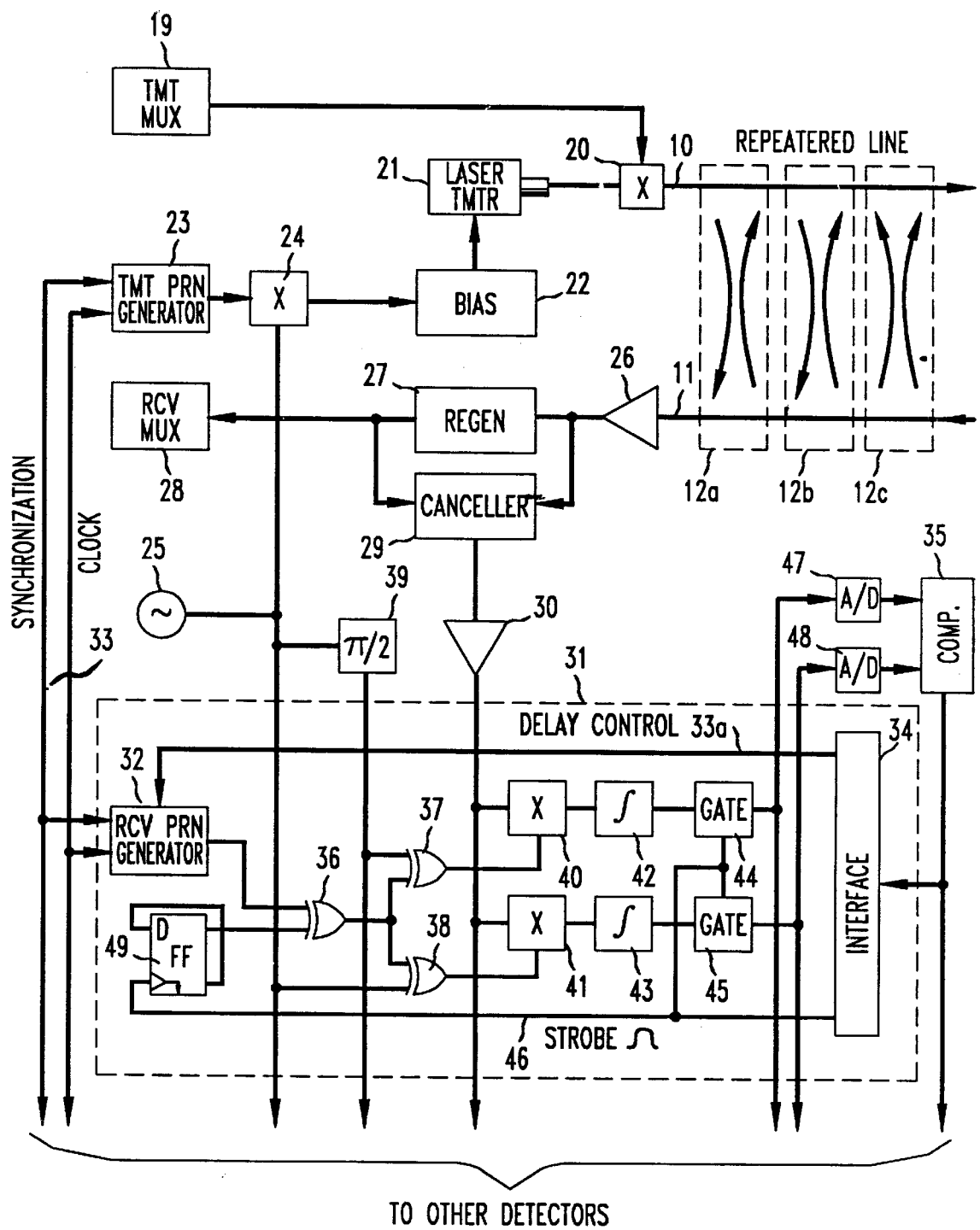
FIG. 2 is a schematic diagram of an optical transmission system incorporating an example of the optical line monitor of this invention.

FIG. 2 illustrates an example of a circuit for transmission, recovery, and detection of supervisory signal returned to the transmitting terminal via high loss loopback circuits such as the one shown in FIG. 1. The circuit of FIG. 2 preferably is located in one terminal of the optical transmission system. FIG. 2 shows the two optical fibers 10 and 11 of FIG. 1 and schematically illustrates three repeaters 12a, 12b and 12c, one of which is shown in more detail in FIG. 1. The arrows in each repeater 12a, 12b and 12c symbolize the high loss loopback described above. The number of repeaters used is determined by the length of the transmission system and the required signal amplitude along the fibers. Although not shown in FIG. 2, those skilled in the art will appreciate that the fibers 10 and 11 are connected to similar circuitry in another terminal. They would also appreciate that the terminals would be located on shore and the fibers 10 and 11 and the repeaters 12a, 12b, 12c. . . would be submerged underwater in submarine applications. It is advantageous for only the simplest and most reliable parts of a line monitor to be located in the repeaters and on the fibers. As the discussion here makes plain, this is achieved most admirably in this invention.

A transmit multiplexer in FIG. 2 produces a signal representing information to be transmitted from the terminal of FIG. 2 through the fiber 10 to the other terminal not shown in FIG. 2. The signal produced by the transmit multiplexer 19 is one input to a modulator 20. The other input to the modulator 20 is an optical carrier appearing at the output of a laser transmitter 21. The modulator 20 causes the optical carrier to be modulated in accordance with the information contained in the signal produced by the transmit multiplexer 19. The amplitude of the optical carrier is determined by the output current of a laser bias circuit 22.

The apparatus of FIG. 2 produces a supervisory signal useful in identifying the presence and location of faults on the optical transmission system. The supervisory signal comprises a repetitive pseudo random word produced by a pseudo random word generator 23. Preferably, the bit rate and word length of the pseudo random words produced by the generator 23 are such that the word period is longer than the round trip delay from the terminal to the repeater furthest from the transmitter and back. For example, the word length may be $2^{23}-1$ bits at a bit rate of 100 kb/sec. in a 10,000 km transmission system. The input power level is chosen such that the revenue producing signals and the supervisory signals do not unduly interfere with each other and the supervisory signal is conveniently recoverable at the launching terminal after loopback from the repeaters.

The pseudo random words produced by the pseudo random word generator 23 are one input to a modulator 24. A carrier signal, which may be a sine wave or a square wave signal produced by a carrier source 25, is another input to the modulator 24. The output of the modulator 24 is the carrier from source 25 biphase modulated by the pseudo random sequence from the pseudo random number generator 23. The output of the modulator 24 is connected to the bias circuit 22 which controls the bias current and, therefore, the amplitude of the optical carrier signal from the laser transmitter 21. The supervisory signal thereby amplitude modulates the average power of the signal transmitted from the terminal along fiber 10. Alternatively, the supervisory signal could be linearly combined with the output of the transmit multiplexer 19 and applied to modulator 20.

As explained above in connection with a description of FIG. 1, a portion of this amplitude modulated optical signal is looped back to the transmitting terminal in each of the repeaters. The loopback signals from fiber 10, the signals from the other terminal traveling along fiber 11, and any noise produced in the transmission system and traveling in fiber 11 is directed to a receiver 26 which coverts the optical signals on fiber 11 to electrical signals. The receiver 26 may, for example, be a PIN diode receiver or an avalanche photodetector. The output of the receiver 26 is connected to a regenerator 27 which shapes and retimes the pulses in the signal from the receiver 26. The shaped pulses are directed to a multiplexer 28 which receives the information transmitted from the terminal transmitting on fiber 11.

Figure 3:
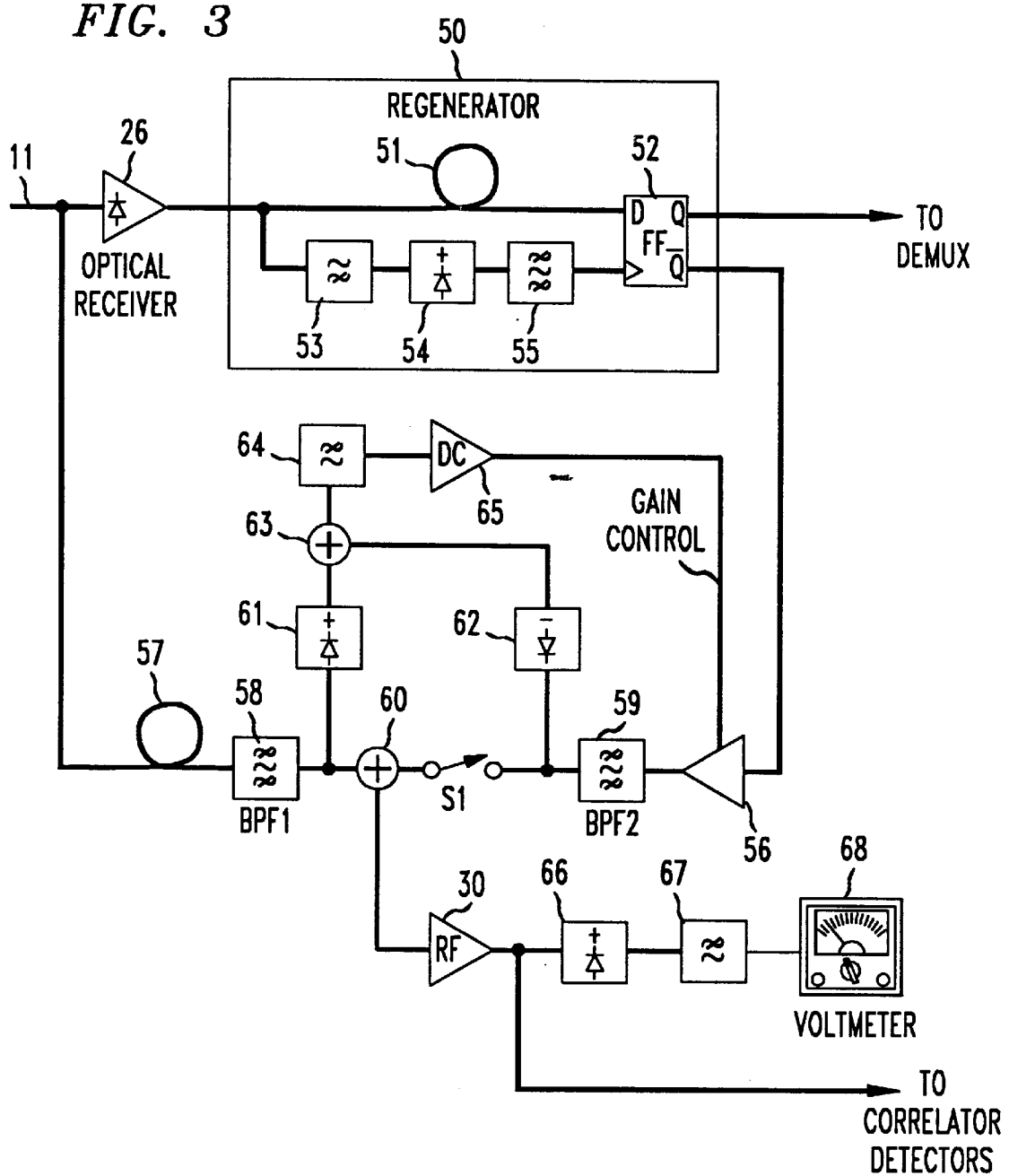
FIG. 3 is a more detailed schematic diagram of the canceller circuit shown in FIG. 2.

As is explained in detail with respect to FIG. 3, the regenerator 27 not only produces a data signal for reception by the multiplexer 28, it also produces the inverse of such data signal. The unregenerated data signal from the receiver 26 and the inverse of the regenerated data signal from the regenerator 27 are input to a canceller circuit 29 which is illustrated in more detail in FIG. 3.

The canceller circuit 29 adds the output of the receiver 26 and substantially the inverse of that signal so as to essentially cancel the data signal from the far terminal transmitting on fiber 11, and thus reduce the interference caused by that data signal with the monitoring function. The output of the canceller 29 is connected to the input of an RF amplifier 30 which amplifies the supervisory signals thereby recovered from the signal on fiber 11.

The amplified supervisory signal from amplifier 30 is then directed to a series of detectors. There is a detector for each repeater on lines 10 and 11. Each of the detectors uses a correlation technique to produce an output representing the portion of the supervisory signal looped back by its respective repeater. That output contains information which can be used to determine the performance of the transmission system out to the location of the respective repeater. Thus, the existence and location of faults on the transmission system may be identified.

One of the detectors 31 is shown in detail in FIG. 2. By way of example, the detector 31 may be the detector for repeater 12a. There are similar detectors for each of the other repeaters 12b, 12c. . . . The detector 31 contains a receive pseudo random number generator 32 which is synchronized with the transmit pseudo-random number generator 23, as indicated symbolically by line 33a. The same clock which clocks the generator 23 also clocks the generator 32. Generator 32 produces the same pseudo random number sequence as generator 23, but it produces that sequence in a delayed fashion with respect to sequence produced by generator 23. The magnitude of the delay is set to be equal to the round trip time between the transmit pseudo random number generator 23 and the repeater 12a. Each of the detectors for the other repeaters contain delayed production of pseudo random number sequences, the delay being equal to the round trip time between the production of a pseudo random number by generator 23 and the receipt of that number after loopback by the repeater associated with that detector.

The pseudo random sequence produced by generator 32 can be given a predetermined delay with respect to the sequence produced by generator 23 in any manner. For example, the delay can be produced by a counter preset by a computer 35 which sets the required time delay in each of the detectors via an interface such as an interface 34 and a delay control line 33a.

The number sequence from generator 32 is directed to one input of an exclusive OR gate 36. The output of the exclusive OR gate 36 is connected to one of the inputs of each of exclusive OR gates 37 and 38. The other input of exclusive OR gate 38 is connected to the carrier source 25. The phase of the carrier from source 25 is shifted in phase by 90° in phase shifter 39. The output of the phase shifter 39 is connected to the other input of exclusive OR gate 37. The sequence from generator 32 thus bi-phase modulates two quadrature carriers via the exclusive OR gates 37 and 38. The output of exclusive OR gate 37 is connected to one input of a multiplier 40. The other input of multiplier 40 is connected to the output of the RF amplifier 30. The output of exclusive OR gate 38 is connected to one input of another multiplier 41. The other input of the multiplier 41 is connected to the output of the RF amplifier 30.

The multipliers 40 and 41 constitute homodyne demodulators. The output of each demodulator contains a DC component proportional to the product of the magnitude of the signal returned by repeater 12a and the cos θ, where θ is the difference in phase between the locally generated carrier and that of the received signal.

The output of multiplier 40 is connected to the input of an integrator 42 and the output of multiplier 41 is connected to the input of another integrator 43. The DC components produced at the outputs of multipliers 40 and 41 are integrated by the integrators 42 and 43. In effect, the integrators 42 and 43 amplify the DC components and suppress the noise in the outputs of the multipliers 40 and 41. The signal output caused by the DC components in effect increases with time, but the noise does not affect the output of the integrators because it has a zero average value.

The outputs of the integrators 42 and 43 are indications of the performance of the transmission system from the trans-mitting terminal to the repeater 12a associated with the detecter 31. Detection of the magnitude of those outputs and their changes over time is a means by which the existence and location faults can be identified in the transmission system. Similarly, the magnitude and changes in corresponding signals produced by the other detectors are an indication of the existence and location of faults in the transmission system in other locations.

The magnitude and changes in magnitude in the detection signal may be observed in any desired way to ascertain transmission system performance. In the example of the invention shown in FIG. 2, the outputs of the integrators 42 and 43 are sampled periodically by selectively connecting the integrator outputs to analog to digital converters 47 and 48, via gates 44 and 45, which are closed by the occurrence of a strobe pulse produced on line 46 from the computer interface 34. Converters 47 and 48 produce digital numbers related to the magnitude of the voltages output by the integrators 42 and 43. The converters input those numbers to the computer 35. The numbers and their changes over time may be observed to monitor the performance of the transmission system out to repeater 12a. For example, the numbers may be squared and accumulated over a predetermined measurement period to accomplish quadrature detection. Quadrature detection is used because the phase of the received carrier cannot, in general, be determined. Let θ= the phase difference between the transmitted and received carrier. The outputs of the multipliers 40 and 41 both are proportional to the magnitude of the received signal, A. They are also proportional to the cos(θ) and the $$\cos\left(\theta + \frac{\pi}{2}\right),$$

respectively. Squaring and adding the outputs yield $A^2[(\cos^2(\theta)+\sin^2(\theta)]=A^2$, the magnitude squared of the desired component.

The integrator outputs are sampled when the strobe pulse on line 46 is high. The strobe line 46 is connected to the clock input of a D flip flop 49, the output of which is connected to one input of the exclusive OR gate 36 which also has the output of the receive pseudo random number generator 32 connected to its other input. On the falling edge of each strobe pulse, the D flip flop 49 is clocked, causing it to change state which, in turn, causes an inversion in the output of the exclusive OR gate 36. Inversion of the output of the exclusive OR gate 36 at each falling edge of the strobe pulse causes a resulting inversion of the demodulator carrier signals and a change in the polarity of the demodulator output signals from the multipliers 40 and 41. The integrators thus perform dual slope integration, which eliminates the effect of any dc imbalance in the demodulator and integrators. The integrators may be ac coupled by circuits whose time constants are long compared to the sampling period. The outputs of the integrators approximate triangular waves, which are sampled at their turning points when the strobe line 46 is high. At the end of the measurement, the average received signal at the integration output is given by $$\frac{2}{N}\left[\left(\sum_{n=1}^{N}(-1)^n V1_n\right)^2 + \left(\sum_{n=1}^{N}(-1)^n V2_n\right)^2\right]^{1/2}$$

where $V1_n$ and $V2_n$ are the nth sample values of the two integration outputs and N is the number of sampling intervals.

When the line monitor in accordance with this invention operates on an in-service basis, the received loopback signals are superimposed upon the data signal transmitted from the far terminal. Because the power spectrum of the data signal is near maximum in the frequency band of the line monitor signal, it is the dominant source of interference. To reduce the interference a data canceller has been devised. FIG. 3 shows a detailed example of a canceller circuit which achieves a substantial reduction in interference.

FIG. 3 shows the optical receiver 26 described above and shown in FIG. 2. The output of the optical receiver 26 is connected to a regenerator 50 which shapes the data signal received from fiber 11. The output of the receiver 26 is passed through a delay element 51 and is directed to the input of a D-flip flop 52. A clock signal for the D-flip flop 52 is produced by passing the output of the receiver 26 through a high pass filter 53, a rectifier 54, and a band-pass filter 55. The Q output of the flip flop 52 is a quantized version of the linear output of the optical receiver 26 and is sent to the receive demultiplexer 28 of FIG. 2.

The $\overline{Q}$ output of the flip flop 52 is a quantized and inverted version of the linear output of the optical receiver 26 and is fed to the input of a variable gain amplifier 56 whose gain is automatically controlled as described below. The output of the receiver 26 is fed to the input of a delay element 57. The outputs of the delay element 57 and the amplifier 56 are filtered by identical band pass filters 58 and 59, respectively. The output of band pass filter 58 is connected to one input of a summing element 60. The output of the band pass filter 59 is passed to another input of the summing element 60 via a switch S1. The summing element 60 produces an output directed to the RF amplifier 30 shown in FIGS. 2 and 3. That output is related to the sum of the output of the receiver 26 and the inverted output of the regenerator 50. The data signal component of the signal on fiber 11, and its possible interference in the monitoring function, are thereby substantially eliminated in the output of the summing element 60.

A feedback loop provides automatic amplitude balance of the two signals which are input to the summing element 60. In this regard, a rectifier 61 provides rectification of predetermined polarity, for example, positive polarity rectification, of the output of the band pass filter 58 and another rectifier 62 provides opposite polarity rectification, for example, negative polarity rectification, of the output of the band pass filter 59. The outputs of the rectifiers 61 and 62 are summed in a summing element 63, which produces an error signal at its output. The error signal is directed through a low pass filter 64, the output of which is amplified by a dc amplifier 65. The dc amplifier 65 produces an automatic gain control signal directed to the gain controlling input of the variable gain amplifier 56. The feedback loop provides automatic amplitude balance of the two signals before they are summed and amplified in the RF amplifier 30. In addition to gain control, automatic delay compensation may be used where the relative delay in the system is not sufficiently stable. The output of the RF amplifier 30 is connected to the inputs of correlation detectors such as the detector 31 shown in FIG. 2.

By suppressing the data interference by, say 20 dB, the measurement time can be reduced by a factor of about 100. This reduction in measurement time makes in service line monitoring feasible. Integration times, however, may be relatively long, for example, several hours, which is why it is advantageous to use a separate detector channel for each repeater in the system. This will permit essentially continuous and concurrent monitoring of the loopback losses of the entire system. By identifying localized sources of degradation as they occur, ambiguities in loopback signatures due adjacent degradations or changes can be resolved.

In order to plan maintenance, repairs, and restorations, it is highly desirable to accurately measure system end-to-end margin and its variation with time. Margin is defined as the actual signal-to-noise ratio divided by the signal-to-noise ratio necessary to meet error rate requirements (expressed in dB). The interference canceller described above in FIG. 3 can provide a measure of the received signal-to-noise ratio and hence the end-to-end margin. The cancellation ratio of the canceller circuit is monotonically increasing function of the signal-to-noise ratio. That this should be true can be understood by the following reasoning. The canceller forms the difference of two signals, one of which represents the true signal that has been distorted (multiplied by a constant) plus additive noise. The other is the true signal that has been regenerated. The first order effects of distortion can be compensated by linear weighting. The resulting difference between the two signals, when divided by the value of the received signal plus noise equals $$\frac{N}{N+S}$$

which when inverted and expressed in dB equals the canceller ratio. The canceller ratio is analogous to the noise power ratio commonly used to evaluate signal-to-noise ratios in frequency division multiplexed analog transmission systems. The canceller ratio very closely approximates the ratio of signal density to noise density measured through identical bandpass filters. It follows that by periodically monitoring the cancellation ratio changes in margin can be detected.

In the circuit of FIG. 3, the cancellation ratio may be determined by directing the output of RF amplifier 30 to a rectifier 66, then through a low pass filter 67, and finally to a voltage measuring device 68 such as a voltmeter or computer. The cancellation ratio equals the reading taken by the voltage measuring device 68 where switch S1 is open divided by the reading with switch S1 closed. The result is an indication of the overall signal-to-noise ratio or end-to-end margin of the transmission system.

I claim:

1. An optical transmission system comprising:
   a first optical fiber extending between first and second terminals for carrying optical signals from the first terminal to the second terminal;
   a second optical fiber extending between first and second terminals for carrying optical signals from the second terminal to the first terminal;
   at least one optical repeater coupled to the first and second optical fibers between said first and second terminal, said repeater for optically amplifying signals in the first and second optical fibers, said repeater having a permanently connected passive high loss loopback circuit between the first and second optical fibers, the loopback circuit including:
      a first optical coupler having an input responsive to optical signals in the first optical fiber and an output producing optical signals related to the optical signals in the first optical fiber;
      an attenuator having an input responsive to the optical signals output by the optical coupler for attenuating by a predetermined amount the signals output by the optical coupler, and
      a second optical coupler responsive to the attenuated optical signals from the attenuator for returning the attenuated signals to the first terminal via the second optical fiber; and wherein said first terminal includes a transmitter and receiver, said transmitter for launching an optical signal on the first optical fiber and said receiver for detecting variations in the returned attenuated optical signal on the second optical fiber to identify the existence and location of a fault in the optical transmission system.

2. The optical transmission system of claim 1, in which the loopback circuit provides about 45 dB of loss.

3. The optical transmission system of claim 1, wherein the transmitter comprises a means for producing a pseudo random number having a predetermined word length produced at a predetermined bit rate.

4. The optical transmission system of claim 1, wherein the receiver comprises a means for correlating the optical signal launched on the first optical fiber with the signal returned by the loopback circuit.

5. The optical transmission system of claim 4, in which the correlating means comprises:

a means for delaying the optical signal launched on the first optical fiber by an amount corresponding to a time delay between the launching of the optical signal and the return of the optical signal to the first terminal via the loopback means;

a means for recovering the optical signal from a noise signal and a data signal in the second fiber;

a means for producing a signal related to the product of the recovered signal and the delayed optical signal; and a means for integrating over a predetermined time the signal related to the product of the recovered signal and the delayed optical signal.

6. The optical transmission system of claim 1, wherein the transmitter launches an amplitude modulated signal on the first optical fiber and the receiver demodulates the modulated signal returning to the first terminal in the second optical fiber.

7. The optical transmission system of claim 1, wherein the receiver comprises a means for canceling data signals.

8. The optical transmission system of claim 7, in which the cancelling means comprises a means responsive to signals transmitted from the second terminal to the first terminal for producing regenerated data signals from the transmitted signals and for producing the inverse of the regenerated data signals; and a means responsive to the transmitted signals and the inverse of the regenerated data signals for producing a looped back supervisory signal substantially free of the data signals.

9. The optical transmission system of claim 8, in which the cancelling means further comprises an automatic gain control means for equalizing the magnitudes of the transmitted signal and the inverse of the regenerated data signal.

10. The optical transmission system of claim 9, in which the automatic gain control means comprises a means responsive to the transmitted signal and the inverse of the regenerated data signal for producing an error signal which controls the gain of a means for amplifying the inverse of the regenerated data signal.

11. The optical transmission system of claim 8, further comprising a means responsive to the signals from the second terminal to the first terminal for producing a signal related to the signal-to-noise ratio in the optical fibers.

* * * * *